United States Patent
Arkko et al.

(10) Patent No.: US 8,711,044 B2
(45) Date of Patent: *Apr. 29, 2014

(54) ANTENNA ARRANGEMENT AND ANTENNA HOUSING

(71) Applicant: Nokia Corporation, Espoo (FI)

(72) Inventors: Aimo Arkko, Ruutana (FI); Jani Ollikainen, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 13/871,565

(22) Filed: Apr. 26, 2013

(65) Prior Publication Data
US 2013/0244739 A1    Sep. 19, 2013

Related U.S. Application Data

(63) Continuation of application No. 12/595,056, filed on Nov. 12, 2009, now Pat. No. 8,432,321.

(51) Int. Cl.
*H01Q 1/24* (2006.01)

(52) U.S. Cl.
USPC .......................................... 343/702; 343/767

(58) Field of Classification Search
USPC ........................................... 343/702, 767, 768
See application file for complete search history.

(56) References Cited

U.S. PATENT DOCUMENTS

| | | | |
|---|---|---|---|
| 5,396,202 A | 3/1995 | Scheck | 333/230 |
| 5,661,493 A | 8/1997 | Uher et al. | 343/700 |
| 5,914,693 A | 6/1999 | Takei et al. | 343/767 |
| 6,282,433 B1 | 8/2001 | Holshouser | 455/556 |
| 6,337,662 B1 | 1/2002 | Cassel | 343/702 |
| 6,424,300 B1 | 7/2002 | Sanford et al. | 343/702 |
| 6,486,836 B1 | 11/2002 | Hill | 343/702 |
| 6,624,789 B1 | 9/2003 | Kangasvieri et al. | 343/702 |
| 6,801,166 B2 | 10/2004 | Mikkola et al. | 343/700 MS |
| 6,879,293 B2 | 4/2005 | Sato | 343/702 |
| 6,937,196 B2 | 8/2005 | Korva | 343/702 |
| 7,215,600 B1 | 5/2007 | DeRosa | 368/10 |
| 8,054,231 B2 | 11/2011 | Ahn et al. | 343/702 |
| 8,299,971 B2 * | 10/2012 | Talty et al. | 343/702 |
| 8,432,321 B2 * | 4/2013 | Arkko et al. | 343/702 |
| 2001/0053677 A1 | 12/2001 | Schiffer | 455/128 |
| 2002/0050951 A1 | 5/2002 | Durham | 343/700 MS |
| 2003/0075606 A1 | 4/2003 | Connolly et al. | 235/472.01 |
| 2004/0051670 A1 | 3/2004 | Sato | 343/702 |
| 2005/0052329 A1 | 3/2005 | Tsukamoto | 343/767 |
| 2006/0049987 A1 | 3/2006 | Herrick | 343/700 MS |
| 2006/0097941 A1 | 5/2006 | Bettner et al. | 343/767 |
| 2006/0244663 A1 | 11/2006 | Fleck et al. | 343/700 |
| 2008/0007476 A1 | 1/2008 | Lee | 343/850 |
| 2008/0143611 A1 | 6/2008 | Wang | 343/702 |

(Continued)

FOREIGN PATENT DOCUMENTS

| | | |
|---|---|---|
| EP | 0 018 476 | 3/1980 |
| EP | 0250832 A2 | 1/1988 |
| JP | 57103406 A | 6/1982 |
| JP | 09074312 | 9/1995 |
| JP | 11074723 A | 3/1999 |
| JP | 2004242034 | 2/2003 |
| JP | 2005167833 A | 6/2005 |
| WO | WO-01/20716 A1 | 3/2001 |

(Continued)

*Primary Examiner* — Hoanganh Le
(74) *Attorney, Agent, or Firm* — Harrington & Smith

(57) ABSTRACT

An antenna arrangement including an antenna occupying at least a first plane; a conductive structure that is isolated from the antenna but is arranged to be parasitically fed by the antenna, the conductive structure having a slot and occupying at least a second plane different to but adjacent the first plane.

23 Claims, 2 Drawing Sheets

(56) References Cited

U.S. PATENT DOCUMENTS

2009/0153410 A1 6/2009 Chiang et al. ............. 343/702
2009/0153412 A1 6/2009 Chiang et al. ............. 343/702
2009/0153416 A1 6/2009 Arbin et al. ............... 343/702
2009/0289858 A1 11/2009 Olsson ...................... 343/702

FOREIGN PATENT DOCUMENTS

| WO | WO-2004/100313 A1 | 11/2004 |
| WO | WO-2006/040609 A1 | 4/2006 |
| WO | WO-2006/114477 A1 | 11/2006 |
| WO | WO-2007/097687 A1 | 8/2007 |

\* cited by examiner

ANTENNA ARRANGEMENT AND ANTENNA HOUSING

CROSS-REFERENCE TO RELATED APPLICATIONS

This patent application is a continuing application of U.S. application Ser. No. 12/595,056, filed Nov. 12, 2009, the disclosure of which is incorporated by reference in its entirety.

FIELD OF THE INVENTION

Embodiments of the present invention relate to an antenna arrangement and/or an apparatus housing an antenna arrangement. In particular, in some embodiments the housing is conductive.

BACKGROUND TO THE INVENTION

As is well known a conductive enclosure shields the interior cavity defined by the enclosure from electromagnetic (EM) radiation. The conductive material forms a block to photons and the effectiveness of the block depends upon the thickness of the material, the frequency of the photon and the electromagnetic properties of the material (electrical conductivity and magnetic permeability). For metal at radio frequencies, thin layers can provide effective high impedance shields.

There is a current trend towards using metallic housings for electronic apparatuses. A metallic housing may be used for a number of reasons. It may, for example, provide a good electrical earth for the apparatus or it may, if applied as an exterior coat, where it provides a pleasing look and feel.

It is now becoming common for an electronic apparatus to include wireless RF technology. Such technology includes, for example, sensing technology such as RFID, mobile cellular technology such as UMTS, GSM etc, cable-less technology such as Bluetooth and wireless USB and networking technology such as WLAN.

It would be desirable to provide an apparatus that is functional in one or more of these wireless technologies and uses a conductive housing.

One solution would be to provide one of more external antennas for the apparatus but this is undesirable as it increases the size of the apparatus and also decreases it eye appeal.

BRIEF DESCRIPTION OF THE INVENTION

According to some embodiments of the invention there is provided an antenna arrangement comprising: an antenna occupying at least a first plane; a conductive structure that is isolated from the antenna but is arranged to be parasitically fed by the antenna, the conductive structure having a slot and occupying at least a second plane different to but adjacent the first plane.

According to some embodiments of the invention there is provided an apparatus comprising a conductive housing that defines an interior cavity, an opening in the conductive housing, and an antenna positioned within the cavity adjacent the opening.

According to some embodiments of the invention there is provided an antenna arrangement comprising: an antenna having a first resonant wavelength $\lambda$; a conductive housing that is isolated from the antenna but is indirectly fed by the antenna, the conductive housing having a slot that has a length that corresponds to a multiple of $\lambda/4$.

The inventors have realized that the impedance a conductive housing presents may be tuned for a particular frequency by carefully positioning and sizing an opening in the conductive housing. The impedance of the housing can, for example, be tuned for a resonant frequency of an antenna thereby enabling the antenna to be placed in the interior of the housing.

BRIEF DESCRIPTION OF THE DRAWINGS

For a better understanding of the present invention reference will now be made by way of example only to the accompanying drawings in which.

DETAILED DESCRIPTION OF EMBODIMENTS OF THE INVENTION

Figure 1A:
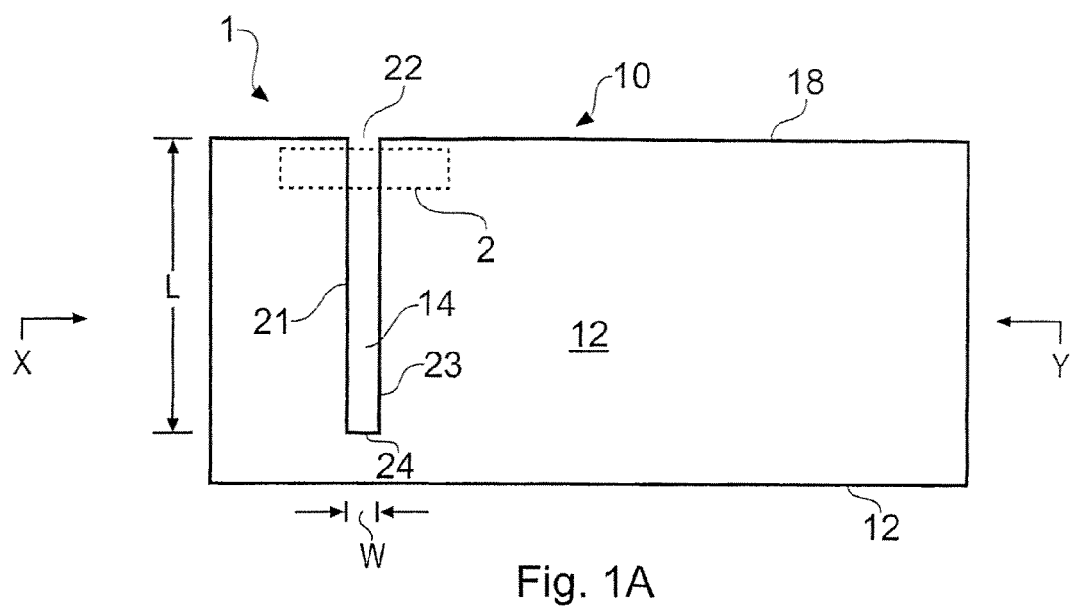
FIG. 1A schematically illustrates in plan view an apparatus comprising a slotted external conductive housing element that houses an antenna FIG. 1B schematically illustrates a cross-sectional view of the apparatus illustrated in FIG. 1A.

The Figures schematically illustrate an antenna arrangement 10 comprising: an antenna 2 occupying at least a first plane 6; and a conductive structure 12 that is not electrically connected to the antenna 2 but is parasitically fed by the antenna 2, the conductive structure 12 having a slot 14 and occupying at least a second plane different to but adjacent the first plane.

Figure 1B:
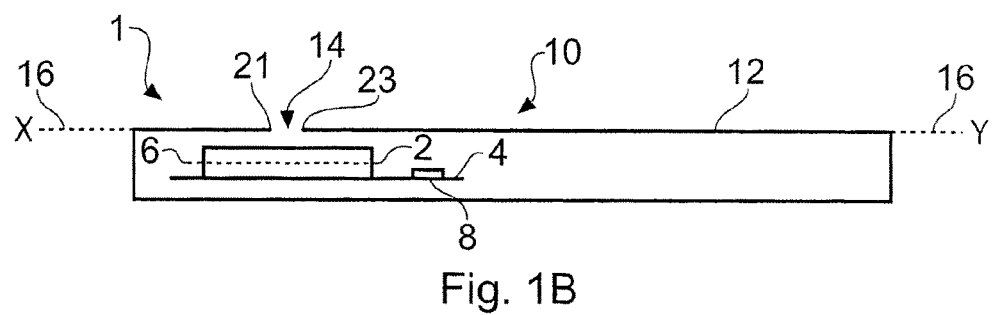

In particular, FIGS. 1A and 1B illustrate an apparatus 1 comprising an external conductive housing element 12 that houses an antenna 2. In this example, the housing element 12 forms a conductive structure that almost entirely surrounds a cavity 3 housing the internal antenna 2.

The conductive housing element 12 comprises a slot 14 that facilitates the transfer of electromagnetic waves between the exterior of the housing 12 and the antenna 2. The slot 14 is defined by the absence of conductive material in the region of the slot 14. The slot 14 may be an open aperture to the interior cavity 3 or it may be covered by a dielectric that is permeable to electromagnetic radiation such as plastic (other examples are ceramic and ferrite material). In one embodiment, the slot 14 may be engraved on a metal foil covering a plastic substrate.

The slot 14 has a width W defined as the separation between opposing first and second terminating long edges 21, 23 of the housing 12. The width W may be constant for the length of the slot or vary along the length of the slot 14. The slot 14 has a length L defined as the separation between opposing first and second terminating short edges 22, 24 of the housing 12.

in the example illustrated in FIGS. 1A and 1B, the slot is a region lying within a slot plane 16 and the housing element 12 provides a conductive structure that extends in the slot plane 16. At least a portion of the antenna 2 extends in an antenna plane 6, that is adjacent and parallel to (but separate from) the slot plane 16. The antenna 2 does not extend into the slot plane 16.

The position of the antenna 2 relative to the slot 14 is such that it achieves very good or optimal coupling between the antenna 2 and the slotted housing 12.

The antenna 2 and the conductive housing element 12 are galvanically isolated such that there is no dc current path between them. They are, however, arranged for electromagnetic coupling and together form an antenna arrangement 10.

The antenna 2 has a resonant frequency F and the slot 14 is dimensioned to have an electrical length L' that corresponds to one or more multiples of one quarter of the resonant wavelength corresponding to the first resonant frequency F.

$$L'=n\lambda/4$$

where n is a natural number, L' is the electrical length of the slot 14 and $\lambda$ is the resonant wavelength.

The dimensions of the slot result in the housing 12 parasitically resonating with the antenna 2. This results in the characteristics of the antenna arrangement 10 such as bandwidth, efficiency etc being different to that of the antenna 2. The antenna 2 operates as a feed to the antenna arrangement 10.

In the absence of a dielectric covering the slot 14, the electrical length L' may be the same as the physical length L of the slot.

The characteristics of the resonance of the antenna arrangement 10 may be engineered by varying the physical and/or electrical characteristics of the slot 14.

Variations in the physical dimensions of the slot typically affect its associated electrical characteristics such as its electrical length and Q-factor which affect the antenna arrangement's resonant frequency and bandwidth respectively.

For example, varying the physical length L of the slot 14 varies its electrical length.

Varying the physical position of the slot 14 may affect its electrical characteristics. In FIG. 1, the slot 14 terminates on an edge 18 of the housing 12, whereas in the examples illustrated in FIGS. 2 and 3 the slot 14 does not terminate at an edge of the housing but is wholly contained within a face 13 of the housing 12.

Figure 2:
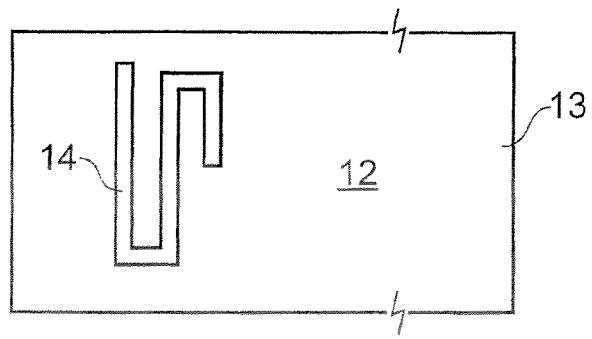
FIG. 2 schematically illustrates in plan view an apparatus comprising an external conductive housing element comprising a meandering slot.
Figure 3:
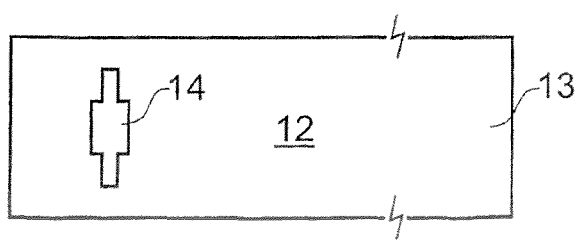
FIG. 3 schematically illustrates in plan view an apparatus comprising an external conductive housing element comprising a slot of variable width.

Increasing the inductance associated with the slot 14 increases the slot's electrical length (which decreases the resonant frequency) and may decrease bandwidth. The electrical length may, for example, be increased by increasing the physical length of the slot. One option is to form the slot from one or more curved sections and another option is to meander the slot 14 as illustrated in FIG. 2 (instead of using a straight slot 14 as in FIGS. 1 and 3). Increasing the capacitance associated with the slot by, for example, decreasing the slot's width as illustrated in FIG. 3 (instead of having a constant width W as in FIGS. 1 and 2) decreases the slot's electrical length (increasing the resonant frequency) and may increase bandwidth.

Figure 4:
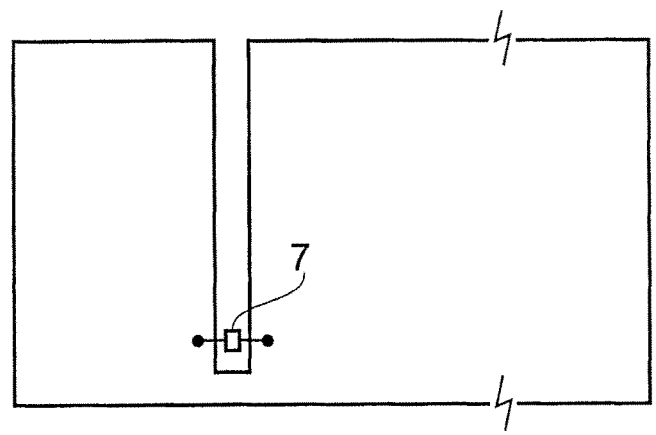
FIG. 4 schematically illustrates in plan view an apparatus comprising an external conductive housing element comprising a slot having an associated electrical tuning circuit.

The electrical characteristics of the slot 14 may be engineered using lumped electrical components as an addition or as an alternative to changing the physical characteristic of the slot 14, FIG. 4 illustrates a slot 14 that has an electrical circuit 7 connected across the slot 14. The electrical component 7 may comprise one or more lumped components.

The electrical characteristics of the antenna arrangement 10 can also be modified by attaching a matching circuit 8 to the antenna 2.

The antenna arrangement is able to operate as a receiver and/or a transmitter at one or more of a large number of frequency bands including the following frequency bands: Bluetooth (2400-2483.5 MHz); WLAN (2400-2483.5 MHz); HLAN (5150-5850 MHz); GPS (1570.42-1580.42 MHz); US-GSM 850 (824-894 MHz); EGSM 900 (880-960 MHz); EU-WCDMA 900 (880-960 MHz); PCN/DCS 1800 (1710-1880 MHz); US-WCDMA 1900 (1850-1990 MHz); WCDMA 2100 (Tx: 1920-1980 MHz Rx: 2110-2180 MHz); PCS1900 (1850-1990 MHz); UWB Lower (3100-4900 MHz); UWB Upper (6000-10600 MHz); DVB-H (470-702 MHz); DVB-H US (1670-1675 MHz); Wi Max (2300-2400 MHz, 2305-2360 MHz, 2496-2690 MHz, 3300-3400 MHz, 3400-3800 MHz, 5250-5875 MHz); RFID UHF (433 MHz, 865-956 MHz, 2450 MHz).

In one particular embodiment schematically illustrated in FIGS. 1A and 1B, the apparatus is a mobile cellular telephone, the antenna 2 is a chip dielectric (ceramic) monopole feeding antenna and operates at the 2.45 GHz WLAN band. It has dimensions of 9 mm×3 mm×2 mm (length, width, height) and is mounted on a piece of copper-free PWB 8 of size 9.75 mm×7 mm. The length of the antenna 2 is orthogonal and transverse to the length of the slot 14. The distance between the antenna 2 and slot 14 is 1.1 mm The housing 12 provides a homogenous, metallic cover for the apparatus. The physical slot length L is about ¼ of the wavelength at 2.45 GHz. The slot 14 has a constant width W of 2.4 mm and a length L of 25 mm i.e. L>10*W. The slot 14 terminates, as in FIGS. 1A and 1B, at an edge of the housing 12. The slot 14 may be integrated into ventilation grates of the housing 12. The slot 14 may be covered with a plastic strip.

Although embodiments of the present invention have been described in the preceding paragraphs with reference to various examples, it should be appreciated that modifications to the examples given can be made without departing from the scope of the invention as claimed.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
   an antenna occupying at least a first plane; and
   a conductive structure that is isolated from the antenna such that there is no dc current between the antenna and the conductive structure but is arranged to be parasitically fed by the antenna, the conductive structure having a slot and occupying at least a second plane different to but adjacent the first plane,
   wherein the conductive structure is at least part of an external housing for a mobile cellular telephone,
   wherein the antenna is an internal antenna located inside the housing,
   wherein the housing has a face bounded by edges and the slot is positioned wholly within the face,
   wherein the antenna is positioned adjacent the slot and
   wherein the conductive structure comprises a metallic covering of the mobile cellular telephone and the slot is covered with a dielectric material, the slot being further defined by an absence of the metallic covering.

2. An apparatus as claimed in claim 1, wherein the housing comprises an edge and the slot terminates at the edge.

3. An apparatus as claimed in claim 1, wherein the antenna has a first resonant frequency and the slot is dimensioned to have an electrical length that corresponds to one or more multiples of one quarter of the resonant wavelength corresponding to the first resonant frequency.

4. An apparatus as claimed in claim 1, wherein the slot has a minimum width and a length and the length is at least ten times greater than the minimum width.

5. An apparatus as claimed in claim 1, wherein the slot has constant width.

6. An apparatus as claimed in claim 1, wherein the slot is straight.

7. An apparatus as claimed in claim 1, further comprising an exterior metallization that defines an interior cavity, wherein the exterior metallization provides the conductive structure and the slot provides an electromagnetic aperture to the interior cavity.

8. An apparatus as claimed in claim 1, wherein the slot may be engraved on a metal foil covering a plastic substrate.

9. An apparatus as claimed in claim 1, wherein the slot lies in the second plane.

10. An apparatus claimed in claim 1, wherein the antenna does not extend into the second plane.

11. An apparatus as claimed in claim 1, wherein the conductive structure extends in the second plane.

12. An apparatus as claimed in claim 11, wherein the conductive structure extends in the second plane for a distance greater than a width of the slot.

13. An apparatus as claimed in claim 1, wherein the slot overlays the antenna.

14. An apparatus as claimed in claim 1, wherein the slot is provided a distance apart from the antenna.

15. An apparatus as claimed in claim 1, wherein the mobile cellular telephone is functional in a wireless technology.

16. An apparatus as claimed in claim 1, wherein the dielectric material is at least one of a plastic material, a ceramic material, and a ferrite material.

17. A mobile cellular telephone housed within a housing that defines an interior cavity an apparatus comprising:
an antenna positioned within the cavity; and
a conductive structure which is at least a part of the housing,
wherein the conductive structure is isolated from the antenna such that there is no dc current between the antenna and the conductive structure but is arranged to be parasitically fed by the antenna,
wherein the conductive structure comprises a slot, wholly within a face of the conductive structure, and
wherein the antenna is adjacent the slot and wherein the conductive structure comprises a metallic covering of the mobile cellular telephone and the slot is covered with a dielectric material, the slot being further defined by an absence of the metallic covering.

18. A mobile cellular telephone as claimed in claim 17, wherein, in operation, the antenna feeds the conductive structure which operates as a resonator.

19. A mobile cellular telephone as claimed in claim 17, wherein the antenna has a first resonant frequency and the slot has an electrical dimension corresponding to a resonance at the first resonant frequency.

20. A mobile cellular telephone as claimed in claim 17, wherein the conductive structure comprises a dielectric substrate and an exterior metallization.

21. A mobile cellular telephone as claimed in claim 17, wherein no conductive element or elements intervene between the antenna and the slot.

22. An antenna arrangement comprising:
an antenna having a first resonant wavelength, $\lambda$; and
a conductive structure that is isolated from the antenna such that there is no dc current between the antenna and the conductive structure but is indirectly fed by the antenna, the conductive structure having a slot wholly within a face of the conductive structure,
wherein the slot that has an electrical length that corresponds to a multiple of $\lambda/31$, the conductive structure forming at least part of an external housing for a mobile cellular telephone,
wherein the antenna is internal of the housing and located adjacent the slot and
wherein the conductive structure comprises a metallic covering of the mobile cellular telephone and the slot is covered with a dielectric material, the slot being further defined by an absence of the metallic covering.

23. An apparatus comprising a housing for a mobile cellular telephone, with exterior metallization, that defines an interior cavity and an antenna arrangement positioned within the cavity, wherein the antenna arrangement comprises:
an antenna occupying at least a first plane; and
a conductive structure that is isolated from the antenna such that there is no dc current between the antenna and the conductive structure but is arranged to be parasitically fed by the antenna, the conductive structure having a slot wholly within a face of the conductive structure, the conductive structure occupying at least a second plane different to but parallel to the first plane,
wherein the exterior metallization provides the conductive structure and the slot provides an electromagnetic aperture to the interior cavity,
wherein the conductive structure comprises a metallic covering of the mobile cellular telephone and the slot is covered with a dielectric material, the slot being further defined by an absence of the metallic covering; and
wherein the antenna is positioned adjacent the slot.

* * * * *